United States Patent
Park et al.

(10) Patent No.: US 9,145,087 B2
(45) Date of Patent: Sep. 29, 2015

(54) ELECTRIC VEHICLE AND CONTROL METHOD THEREOF

(71) Applicant: Hyundai Autron Co., Ltd., Seongnam-si (KR)

(72) Inventors: Hyun-Seok Park, Gunpo-Si (KR); Sung-Mog Yu, Suwon-si (KR); Jin-Ho Cho, Suwon-si (KR)

(73) Assignee: HYUNDAI AUTRON CO., LTD., Seongnam-Si (KR)

( * ) Notice: Subject to any disclaimer, the term of this patent is extended or adjusted under 35 U.S.C. 154(b) by 11 days.

(21) Appl. No.: 14/135,370

(22) Filed: Dec. 19, 2013

(65) Prior Publication Data
US 2014/0176325 A1 Jun. 26, 2014

(30) Foreign Application Priority Data
Dec. 20, 2012 (KR) .......... 10-2012-0149999

(51) Int. Cl.
| | | |
|---|---|---|
| *B60Q 1/00* | (2006.01) | |
| *B60Q 5/00* | (2006.01) | |
| *H02J 7/14* | (2006.01) | |
| *B60Q 9/00* | (2006.01) | |

(52) U.S. Cl.
CPC .............. *B60Q 5/005* (2013.01); *B60Q 5/008* (2013.01); *B60Q 9/00* (2013.01); *H02J 7/1461* (2013.01); *Y02E 60/50* (2013.01); *Y02T 10/7005* (2013.01)

(58) Field of Classification Search
CPC ... Y02T 10/7005; Y02T 90/14; Y02T 90/128; Y02T 90/16; Y02T 10/75; Y02T 10/7055; Y02T 10/7077; Y02T 10/7275; Y02T 10/7044; G07C 5/008; G07C 5/0833; B60C 3/00; B60C 2250/10; B60C 2230/28; B60C 2230/30; B60Q 5/005; B60Q 5/008; B60Q 9/00; H02J 7/1461; Y02E 60/50
USPC ......... 340/455, 438; 701/1, 36; 320/127, 128, 320/107, 109; 903/902–904, 915, 916; 180/54.1, 65.1, 65.21, 65.22; 318/466, 318/139
See application file for complete search history.

(56) References Cited

U.S. PATENT DOCUMENTS

| | | | |
|---|---|---|---|
| 8,669,018 B2 * | 3/2014 | Kim et al. ..................... | 429/452 |
| 2007/0147626 A1 | 6/2007 | Casey et al. | |
| 2007/0246295 A1 * | 10/2007 | Aso ............................... | 181/256 |
| 2007/0257783 A1 * | 11/2007 | Matsumoto et al. ....... | 340/425.5 |

(Continued)

FOREIGN PATENT DOCUMENTS

| | | |
|---|---|---|
| JP | 2000-324618 A | 11/2000 |
| JP | 2008-137610 A | 6/2008 |

(Continued)

*Primary Examiner* — Kerri McNally
(74) *Attorney, Agent, or Firm* — Morgan, Lewis & Bockius LLP

(57) ABSTRACT

The present invention relates to an electric vehicle and a control method thereof. According to the inventive electric vehicle and control method thereof, the state of a fuel cell that is a driving power of the electric vehicle can be sensed to determine whether the fuel cell system is normal or not, and output different sound sources according to the states of the fuel cell system so that the sound outputted as a driving sound while the electric vehicle runs may vary to allow a driver to recognize the state of the electric vehicle and a change in state of the fuel cell. Also, the awareness of difference in driving of the motor can be decreased through the sound outputted as the driving sound of the electric vehicle to improve the driver's satisfaction and allow pedestrians to more easily recognize approach of the electric vehicle.

17 Claims, 4 Drawing Sheets

(56) References Cited

U.S. PATENT DOCUMENTS

2012/0077106 A1* 3/2012 Kim et al. .................... 429/452
2013/0076504 A1* 3/2013 Nakayama .................. 340/466

FOREIGN PATENT DOCUMENTS

| JP | 2010-186456 A | 8/2010 |
| JP | 2011-255874 A | 12/2011 |

* cited by examiner

ELECTRIC VEHICLE AND CONTROL METHOD THEREOF

CROSS-REFERENCE TO RELATED APPLICATION

This application claims priority to Korean Patent Application No. 10-2012-0149999 filed on Dec. 20, 2012 and all the benefits accruing therefrom under 35 U.S.C. §119, the contents of which are incorporated by reference in their entirety.

BACKGROUND

The present invention disclosed herein relates to an electric vehicle and a control method thereof, and more particularly, to an electric vehicle which may output a driving source to a predetermined level corresponding to a state of a fuel cell during a running thereof, and a control method thereof.

An electric vehicle is being actively researched in that it is an alternative with the highest possibility that can solve the automobile pollution problem and an energy problem.

The present invention relates to an electric vehicle and a control method thereof, and more particularly, to an electric vehicle that may sense pedestrians near the electric vehicle during a running thereof to allow the pedestrians to more easily recognize approach of the electric vehicle through a light emitting device with a predetermined output sound, and a control method thereof.

An electric vehicle (EV) is a vehicle obtaining power by driving an AC or DC motor using battery power, and is generally classified into a battery-only electric vehicle and a hybrid electric vehicle. The battery-only electric vehicle drives a motor through battery power, recharges the battery when the power is completely exhausted, and the hybrid electric vehicle drives an engine to generate electricity and charge a battery with the generated electricity, and drives an electric motor through the generated electricity to allow itself to move.

Also, the hybrid electric vehicles may be classified into a series type and a parallel type. The series type hybrid electric vehicle employs a concept in which mechanical energy outputted from an engine is converted to electric energy through a generator, this electric energy is supplied to a battery or motor, thus the vehicle is always driven only by the motor, and the engine and the generator are added to an existing electric vehicle so as to increase the running distance, whereas the parallel type hybrid electric vehicle may be driven by only the battery power, only the engine (gasoline or diesel), or by simultaneously using the engine or the motor according to the running condition.

Since such an electric vehicle or hybrid electric vehicle is driven by using a motor, it is different from a general vehicle.

Since a general vehicle is supplied with a fuel and as the engine is driven, runs, an engine driving sound is generated, whereas since an electric vehicle or a hybrid electric vehicle has no engine driving sound, a driver driving such a vehicle may have a negative feeling on the circumstance.

Also, the different driving sound of such electric vehicles may cause pedestrians not to recognize or to be careless about approach of such vehicles, resulting in an accident.

SUMMARY

The present invention provides an electric vehicle that can sense the state of a fuel cell that is a major driving power for driving thereof to output a sound similar to an engine driving sound according to the state of the fuel cell, and a control method thereof.

In accordance with an exemplary embodiment of the present invention, an electric vehicle includes a fuel cell system supplying electric energy to the electric vehicle; a controller determining the state of the fuel cell system corresponding to fuel cell information inputted from the fuel cell system; a sound source generating unit generating a sound source corresponding to the state of the fuel cell system; and a sound output unit outputting a predetermined sound as a driving sound of the electric vehicle corresponding to the sound source of the sound source generating unit, wherein the sound source generating unit generates different sound sources as the state of the fuel cell system varies.

In accordance with another exemplary embodiment of the present invention, a control method of an electric vehicle includes allowing the electric vehicle to run when a driving power is supplied from a fuel cell system to a motor of the electric vehicle; inputting fuel cell information from the fuel cell system; determining whether the fuel cell system is normal or not corresponding to the fuel cell information; and when the fuel cell system is normal, setting a sound source corresponding to the fuel cell information to output a sound corresponding to the set sound source as a driving sound of the electric vehicle.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
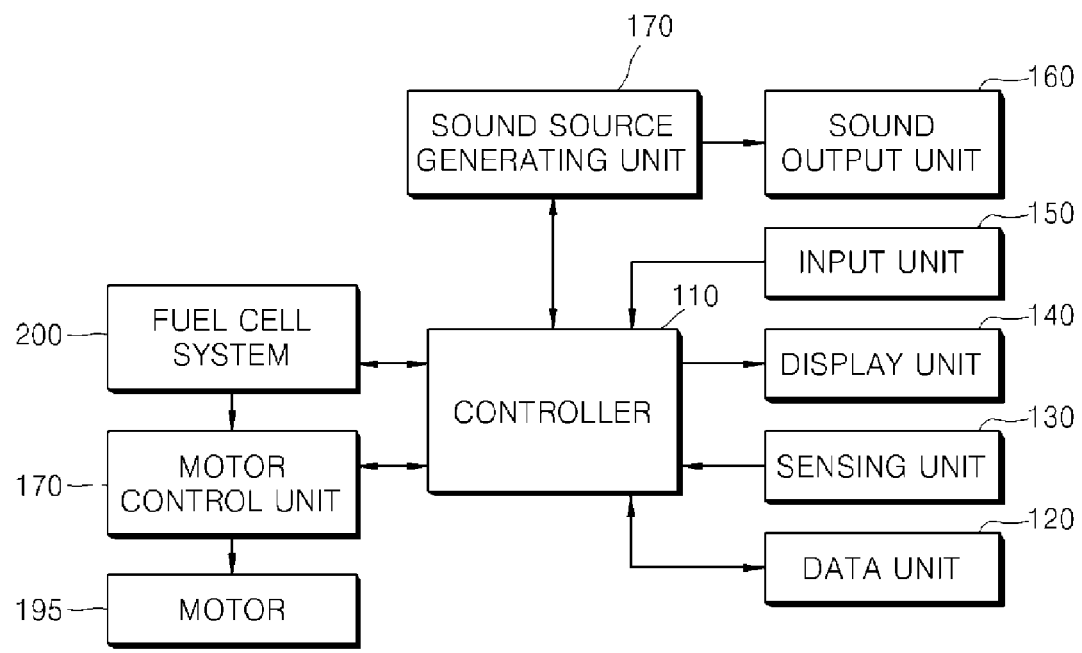
FIG. 1 is a block diagram illustrating a structure of an electric vehicle in accordance with an exemplary embodiment of the present invention.

Hereinafter, specific embodiments will be described in detail with reference to the accompanying drawings FIG. 1 is a block diagram illustrating a structure of an electric vehicle in accordance with an exemplary embodiment of the present invention.

Referring to FIG. 1, an electric vehicle includes a fuel cell system 200, a motor 195, a motor control unit 190, a sound source generating unit 170, a sound output unit 160, a data unit 120, a sensing unit 130, a display unit 140, an input unit 150, and a controller 110 controlling all driving and operations of the electric vehicle.

The fuel cell system 200 includes a fuel supply unit (not shown), a humidifying unit (not shown), an oxidant supply unit (not shown), a feed rate control unit (not shown), a fuel cell stack (not shown), a load (not shown), and a fuel cell sensing unit (not shown).

The fuel cell system 200 may employ a polymer electrode membrane fuel cell (PEMFC) that reforms a fuel to generate hydrogen and electrochemically react hydrogen with oxygen to generate electric energy.

However, the present invention is not limited thereto, and the fuel cell system 200 according to the present embodiment may use a hydrogen-containing liquid or gas fuel such as methanol, ethanol, LPG, LNG, gasoline, butane gas, or the like.

In this regard, the inventive fuel cell stack may be configured in a direct oxidation fuel cell that generates electric energy through a direct reaction between liquid or gas fuel and oxygen in a unit cell.

The fuel cell stack includes a plurality of unit cells that induce an oxidation/reduction reaction between fuel and oxidant. One of the plurality of unit cells includes a membrane electrode assembly (MEA) oxidizing/reducing oxygen in the fuel and the oxidant, and a separator (e.g., bipolar plate) for feeding the fuel and the oxidant to the MEA. The unit cell has a structure in which the separators are respectively disposed at both sides of the MEA positioned at the center.

The fuel used in the fuel cell system 200 commonly indicates hydrocarbon-based fuels in the liquid or gas state, such as methanol, ethanol, natural gases, LPG, or the like. The fuel cell system 200 may use the oxygen gas stored in a separate storage means as the oxidant reacting with hydrogen.

The load in the fuel cell system 200 is electrically connected to a positive (+) terminal and a negative (−) terminal and installed, and is operated by power fed from the fuel cell stack. That is, the motor of the electric vehicle, an inverter converting DC electricity to AC electricity, and the like act as loads for the fuel cell system. Hereinafter, description will be made under the assumption that the load is the motor feeding a driving force to the electric vehicle.

Also, in the case of a hybrid vehicle, an engine as well as the motor and a battery may be equipped such that a driver may drive the vehicle through a selected power source and the power source is automatically changed to the engine according to a driving condition, for example, when the battery is exhausted.

The motor 195 is driven by power fed from the power source, such as the fuel cell, and allows the electric vehicle to run.

The motor control unit 190 generates a control signal for driving at least one motor 195 connected thereto. The motor control unit 190 includes an inverter (not shown), and may control the driving of the motor 195 by controlling the inverter.

The sensing unit 130 senses the driving of the electric vehicle or a signal generated during a predetermined operation and inputs the same to the controller 110. The sensing unit 130 includes a plurality of sensors equipped inside or outside the electric vehicle to input various sensing signals. The types of the sensors may be different from each other according to the equipped locations of the sensors.

The input unit 150 includes a plurality of switch buttons and a touch input means that input signals according to a driver's manipulation.

The input unit 150 also includes a plurality of switches or buttons for driving turn signal lamps, tail lamps, head lamps, brushes, and the like according to the driving of the electric vehicle, and includes a manipulation means for driving steering wheels, an accelerator, a brake, and the like.

The display unit 140 displays driving state and information of the electric vehicle.

Particularly, the display unit 140 may display a change in velocity of the electric vehicle and state information of the power source.

The sound output unit 160 outputs a music, sound effect, and warning sound.

The sound output unit 160 includes at least one speaker. The sound output unit 160 may be installed outside as well as inside the electric vehicle.

The display unit 140 and the sound output unit 160 that are output means output at least one of a warning sound, a warning light, and a warning message in abnormal occurrence as well as state information of the electric vehicle while the electric vehicle runs such that the driver may recognize such a circumstance.

The sound source generating unit 170 generates a sound source according to a control command of the controller 110, converts the generated sound source, and applies the converted sound source to the sound output unit 160 such that a sound corresponding to the converted sound source is outputted as a driving sound of the electric vehicle through the sound output unit 160.

The sound source generating unit 170 may allow a sound similar to an engine driving sound to be outputted or a sound having a specific melody to be outputted through the sound output unit 160 according to the sound source.

The data unit 120 stores control data for driving of the electric vehicle, set data according to the use of a driver, or a driving record.

The data unit 120 also stores the sound source data which is generated and converted through the sound source generating unit 170. The data unit 120 may store a sound source sample used in the sound source generating unit 170, or a sound source data which is separately recorded and stored.

The controller 110 controls the electric vehicle such that set operations are performed corresponding to inputs from the input unit 150 and the sensing unit 130, generates a predetermined command and applies the generated command to the motor to allow the electric vehicle to run, and allows the driving state of the electric vehicle to be outputted through the display unit 140 and the sound output unit 160.

The controller 110 allows the motor to be driven by a driving power fed from the fuel cell system 200, and controls the sound source generating unit 170 such that a predetermined sound is outputted to the sound output unit 160 corresponding to the state of the fuel cell system 200.

At this time, the controller 110 allows a sound to be outputted corresponding to the fuel cell information inputted from the fuel cell sensing unit within the fuel cell system 200.

The fuel cell sensing unit analyzes voltage versus frequency of the fuel cell stack to determine whether the fuel cell is normal or not.

The fuel cell sensing unit determines whether the fuel cell is in normal state or abnormal state and inputs the determined information to the controller 110. The determined fuel cell information includes at least one of abnormality or normality information of the fuel cell stack, voltage and current values information of the fuel cell stack, frequency component information to the voltage and current, usable time information of the fuel cell stack, and generation quantity of the fuel cell.

The controller 110 calculates a total harmonic distortion ratio from the fuel cell information inputted from the fuel cell sensing unit to control the sound source generating unit 170 such that different sounds are outputted according to the calculated total harmonic distortion ratio, and allows the power source to be converted to another power source equipped or a predetermined warning sound to be outputted when the fuel cell is abnormal.

Figure 2:
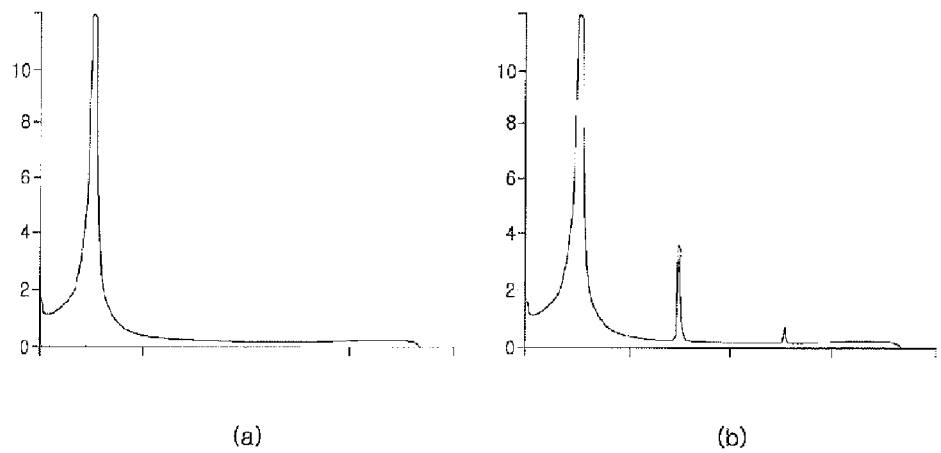
FIG. 2 is graphs showing analysis examples of voltage versus frequency of a fuel cell stack of an electric vehicle in accordance with an exemplary embodiment of the present invention.

FIG. 2 is graphs showing analysis examples of voltage versus frequency of a fuel cell stack of an electric vehicle in accordance with an exemplary embodiment of the present invention.

The fuel cell system 200 may measure the voltage of the fuel cell stack and analyze the frequency component of the measured voltage to confirm whether the fuel cell stack is abnormal or normal. At this time, the abnormality or normality of the fuel cell stack is determined by analyzing the total harmonic distortion ratio of the voltage of the fuel cell stack measured when AC current is applied to the fuel cell stack.

When the total harmonic distortion ratio is more than a reference value, it may be determined that the fuel cell is normal.

When the fuel cell is in a normal state as shown in FIG. 2A and in an abnormal state as shown in FIG. 2B, the frequency characteristics are different from each other, and in the abnormal state shown in FIG. 2B, a harmonic wave component is sensed.

Figure 3:
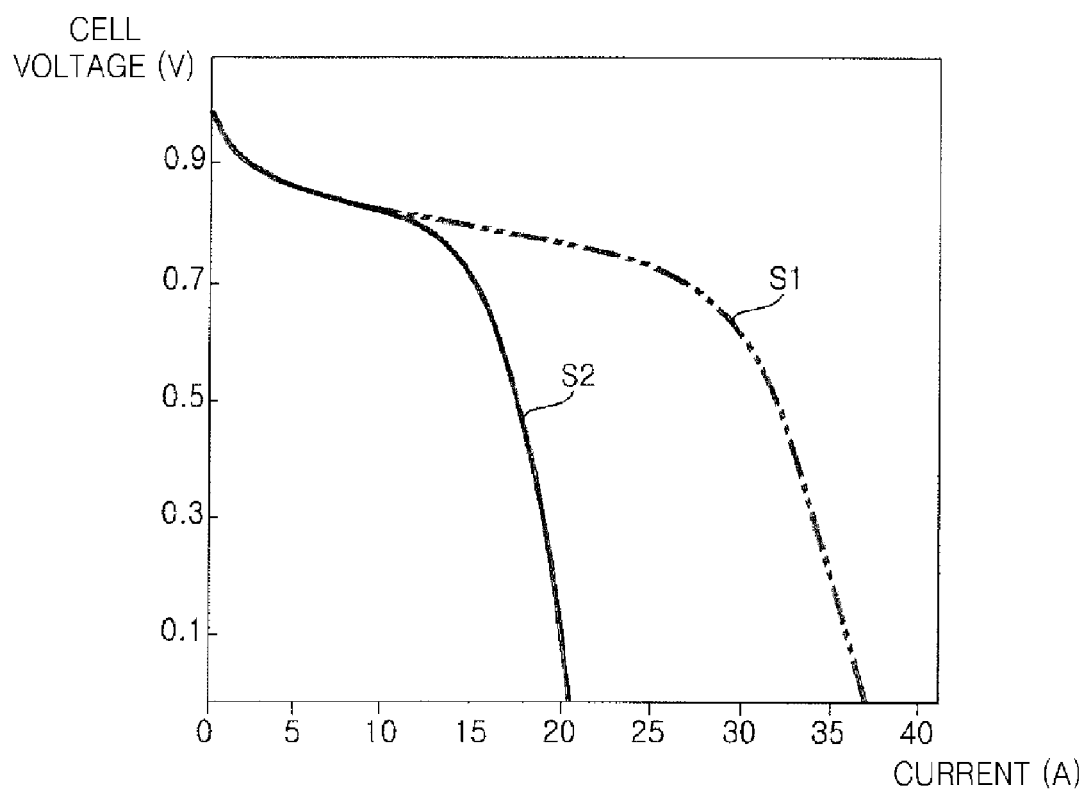
FIG. 3 is a graph showing a characteristic curve of a fuel cell stack of an electric vehicle in accordance with an exemplary embodiment of the present invention.

FIG. 3 is a graph showing a characteristic curve of a fuel cell stack of an electric vehicle in accordance with an exemplary embodiment of the present invention.

As shown in FIG. 3, as current increases, the cell voltage decreases with a predetermined curve form, and the characteristic curve in the normal state is different from that in the abnormal state. That is, the cell voltage in the abnormal state at the same current is different from that in the normal state, and the current values may be different from each other so as to output the same cell voltage.

When the fuel cell system 200 is abnormal, the controller 110 controls the display unit 140 to output a warning message, a warning light, or the like corresponding to the fuel cell information, and changes the output sound to allow the driver to recognize the abnormality of the electric vehicle.

As described above, the controller 110 determines the abnormality or normality of the fuel cell using the total harmonic distortion ratio, and performs the control operations that allow a predetermined sound to be outputted using the characteristics between voltage and current of the fuel cell stack, and different sounds to be outputted according to the value of the total harmonic distortion ratio.

The sound source generating unit 170 generates a sound source according to the control command of the controller 110, and changes the sound source as the total harmonic distortion ratio of the fuel cell stack varies such that different sounds are outputted.

For example, the sound source generating unit 170 classifies the values of the total harmonic distortion ratio into a plurality of stages, and as the value increases, changes the sound source or increases or decreases the number of the sound source samples for generating the sound source such that the sound is outputted differently in stages.

The controller 110 calculates the impedance value of the fuel cell stack based on the fuel cell information to control the sound source generating unit 170 such that different sounds are outputted according to the impedance sections.

At this time, when the current and voltage of the fuel cell stack are specified and inputted from the fuel cell sensing unit, the controller 110 may calculate the impedance by dividing a current magnitude of a frequency of a frequency spectrum by a voltage magnitude of the corresponding frequency through a frequency conversion.

The sound source generating unit 170 may generate different sound sources by setting a different sound source with respect to each of the impedance sections or increasing or decreasing the number of the sound source samples generating the sound sources.

Figure 4:
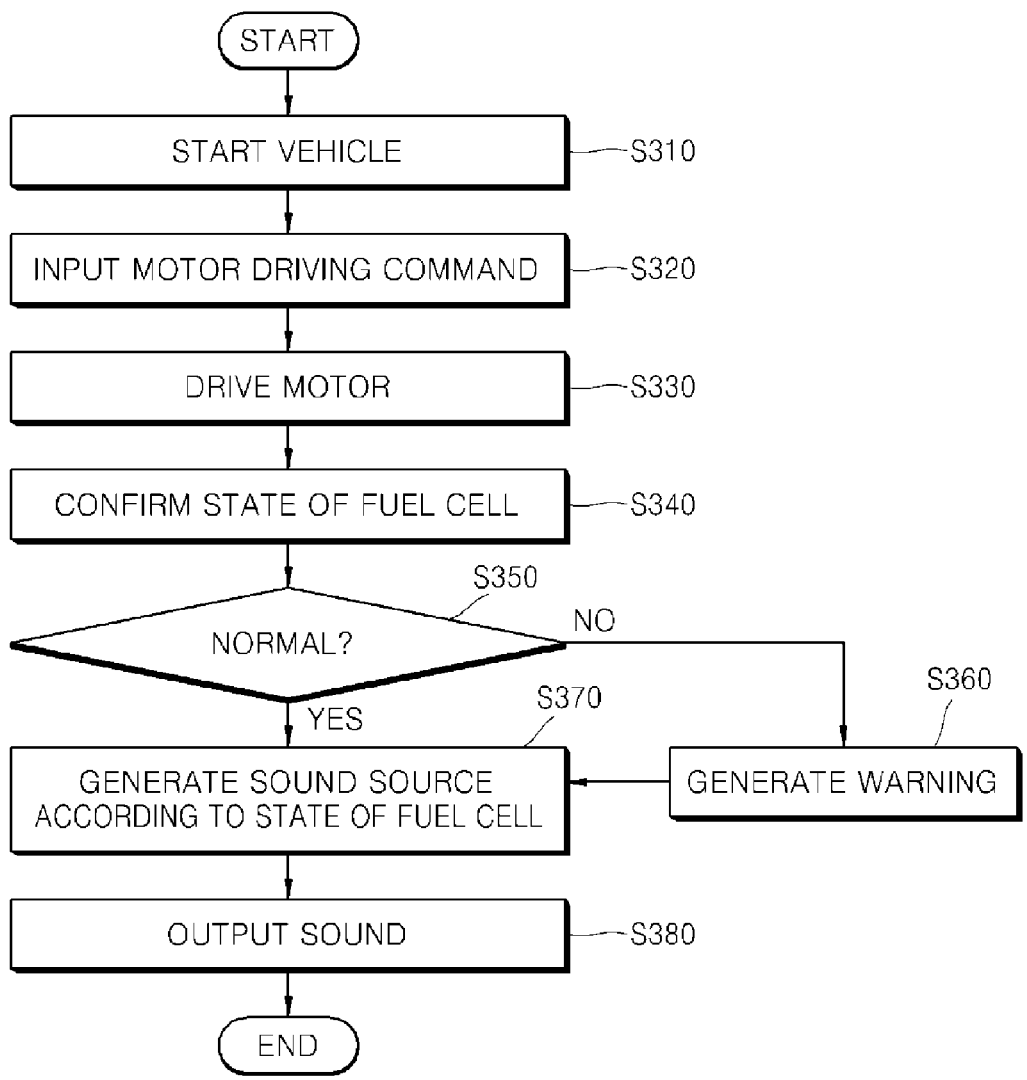
FIG. 4 is a flow diagram showing a control method of an electric vehicle in accordance with an exemplary embodiment of the present invention.

FIG. 4 is a flow diagram showing a control method of an electric vehicle in accordance with an exemplary embodiment of the present invention.

Referring to FIG. 4, when a start key is inputted (S310), a motor driving signal is inputted into the motor control unit 190 (S320). At this time, the controller 110 performs a control such that a driving power having a predetermined voltage is fed from the fuel cell system 200 to the motor control unit 190, and thus the motor is driven to make it possible to drive the electric vehicle (S330).

The fuel cell sensing unit of the fuel cell system 200 measures the state of the fuel cell and inputs the fuel cell information into the controller 110 (S340).

At this time, the controller 110 determines whether the fuel cell system 200 is in a normal state or not according to the fuel cell information, and when the fuel cell system 200 is normal, controls the sound source generating unit 170 such that a sound source is generated according to the state of the fuel cell (S370).

Meanwhile, when the fuel cell system is abnormal, the controller 110 allows a predetermined warning to be outputted (S360). Or, the controller 110 allows a sound other than the sound outputted as the driving sound of the electric vehicle to be outputted as a warning. The warning may be outputted through the display unit 140 as well as in the form of sound.

The sound source generating unit 170 generates a sound source corresponding to the state of the fuel cell according to the control command of the controller 110.

The sound source generating unit 170 sets the sound source in stages corresponding to the input data from the controller 110, i.e., the value of each of the sections into which the total harmonic distortion ratio of the fuel cell is divided, or the impedance value of the fuel cell stack calculated by the controller 110, or increases or decreases the number of sound source samples used in generating the sound sources in stages to generate different sound sources.

The sound source generating unit 170 converts the sound source generated corresponding to the total harmonic distortion ratio or impedance value of the fuel cell stack and applies the converted sound source to the sound output unit 160, and the sound output unit 160 outputs a predetermined sound corresponding to the converted sound source as a driving sound of the electric vehicle (S380).

Since the state of the fuel cell continues to be changed during the driving of the electric vehicle, the sound source generating unit 170 generates or sets different sound sources as the state of the fuel cell varies, and thus allows different sounds to be outputted.

When the fuel cell system 200 is abnormal, the sound source generating unit 170 may also set a different sound source from the sound source outputted during the driving according to a warning signal generating command by the controller 110 and allow the generated different sound source to be outputted through the sound output unit 160. Thus, the sound output unit 160 outputs different driving sounds according to the abnormality or normality of the fuel cell.

Figure 5:
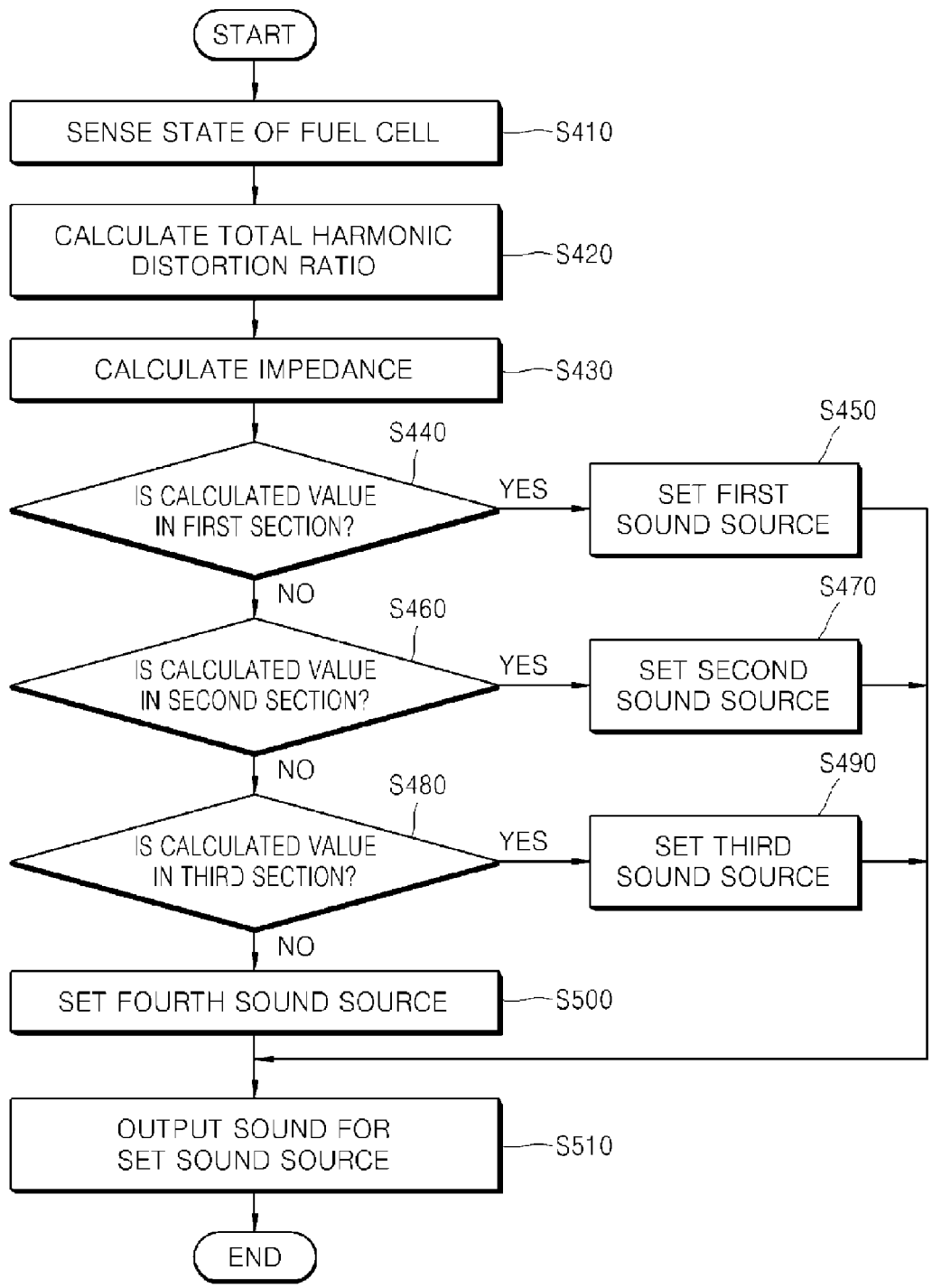
FIG. 5 is a flow diagram showing a method of outputting sound depending on the state of a fuel cell stack of an electric vehicle in accordance with an exemplary embodiment of the present invention.

FIG. 5 is a flow diagram showing a method of outputting sound depending on the state of a fuel cell stack of an electric vehicle in accordance with an exemplary embodiment of the present invention.

Referring to FIG. 5, the fuel cell sensing unit measures or senses data in the fuel cell system and inputs the sensed fuel cell information into the controller 110 (S410).

The controller 110 first determines the abnormality or normality of the fuel cell system based on the fuel cell information inputted from the fuel cell sensing unit, and when it is determined that the fuel cell system is abnormal, allows a warning to be outputted as described above.

The controller also calculates the total harmonic distortion ratio and impedance values of the fuel cell, respectively (S420, S430).

According to circumstances, the harmonic distortion ratio value may be calculated internally within the fuel cell system, and in that case, the calculated total harmonic distortion ratio value included in the fuel cell information is inputted into the controller 110. In the case the total harmonic distortion ratio value is not included in the fuel cell information, the controller 110 calculates the same.

The controller 110 inputs a section value for outputting of a sound source into the sound source generating unit 170 considering any one or both of the total harmonic distortion ratio and the impedance.

Since the total harmonic distortion ratio and the impedance vary with the driving of the vehicle in the normal state of the fuel cell system 200, the total harmonic distortion ratio and the impedance varying in a normal range are divided into a plurality of sections according to their values and a section value for each of the divided sections is applied to the sound source generating unit.

The sound source generating unit 170 sets a sound source corresponding to the state of the fuel cell according to the control command of the controller 110.

When the section value inputted from the controller 110 corresponds to a first section (S440), the sound source generating unit 170 sets a first sound source among the plurality of sound sources (S450).

When the section value inputted from the controller 110 corresponds to a second section (S460), the sound source generating unit 170 also sets a second sound source among the plurality of sound sources (S470).

When the section value inputted from the controller 110 corresponds to a third section (S480), the sound source generating unit 170 sets a third sound source among the plurality of sound sources (S490).

Meanwhile, when the section value inputted from the controller 110 is not included in the first to third sections, the sound source generating unit 170 may set a fourth sound source (S500).

The sound source generating unit 170 may convert the set sound source to apply the converted sound source to the sound output unit 160, and thus the sound output unit 160 may output different sounds while the vehicle runs.

Particularly, as the running state of the vehicle varies, the sound is also changed in stages and outputted, and therefore the driver may confirm a state change of the vehicle through the output sound.

Thus, according to the present invention, the running state of an electric vehicle is determined according to the state of the fuel cell to allow a sound outputted as a driving sound of the electric vehicle to be changed, and the driver may remove the awareness of difference in driving and confirm the state of the vehicle through the output sound.

According to the inventive electric vehicle and control method thereof, the state of a fuel cell that is a major driving power for driving of the electric vehicle can be sensed to determine whether the fuel cell system is normal or not, and output different sound sources according to the states of the fuel cell system so that the sound outputted as a driving sound while the electric vehicle is driven may vary to allow a driver to recognize the state of the electric vehicle and a change in state of the fuel cell. Also, the awareness of difference in driving of the motor can be decreased through the sound outputted as the driving sound of the electric vehicle to improve the driver's satisfaction and allow pedestrians to more easily recognize approach of the electric vehicle.

Although the electric vehicle and the control method thereof have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An electric vehicle comprising:
   a fuel cell system supplying electric energy to the electric vehicle;
   a controller determining a state of the fuel cell system corresponding to fuel cell information inputted from the fuel cell system;
   a sound source generating unit generating a sound source corresponding to the state of the fuel cell system based on a total harmonic distortion ratio determined by the controller or an impedance of a fuel cell stack of the fuel cell system determined by the controller; and
   a sound output unit outputting a predetermined sound as a driving sound of the electric vehicle corresponding to the sound source of the sound source generating unit,
   wherein the sound source generating unit generates different sound sources as the state of the fuel cell system varies.

2. The electric vehicle of claim 1, wherein the fuel cell system further comprises a fuel cell sensing unit sensing a state of the fuel cell stack and inputting the fuel cell information into the controller, the fuel cell information comprising at least one of generation quantity of the fuel cell stack, abnormality or normality information of the fuel cell stack, voltage and current values of the fuel cell stack, frequency component information to the voltage and current values, and usable time information of the fuel cell stack.

3. The electric vehicle of claim 1, wherein the controller determines the total harmonic distortion ratio of the fuel cell stack of the fuel cell system from the fuel cell information, divides values of the total harmonic distortion ratio into a plurality of sections within a normal range, and inputs a section value to the sound source generating unit.

4. The electric vehicle of claim 3, wherein the sound source generating unit sets a different sound source every section corresponding to the section value.

5. The electric vehicle of claim 3, wherein the sound source generating unit generates the sound source by increasing or decreasing the number of sound source samples corresponding to the section value.

6. The electric vehicle of claim 1, wherein the controller determines the impedance of the fuel cell stack of the fuel cell system from the fuel cell information, divides values of the impedance into a plurality of sections within a normal range, and inputs a section value to the sound source generating unit.

7. The electric vehicle of claim 4, wherein the sound source generating unit generates the sound source by increasing or decreasing the number of sound source samples corresponding to the section value.

8. The electric vehicle of claim 1, wherein when the state of the fuel cell system is not normal, the controller generates and outputs a warning signal through a display unit, and
   wherein a warning sound is outputted through the sound output unit.

9. The electric vehicle of claim 8, wherein the sound source generating unit sets a sound source different from a sound source outputted during running of the electric vehicle corresponding to the warning signal of the controller, and outputs a warning sound according to the different sound source.

10. A control method of an electric vehicle comprising:
allowing the electric vehicle to run when a driving power is supplied from a fuel cell system to a motor of the electric vehicle;
inputting fuel cell information from the fuel cell system;
determining whether the fuel cell system is normal or not corresponding to the fuel cell information based on a total harmonic distortion ratio determined by a controller or an impedance of a fuel cell stack of the fuel cell system determined by the controller; and
when the fuel cell system is normal, setting a sound source corresponding to the fuel cell information to output a sound corresponding to the set sound source as a driving sound of the electric vehicle.

11. The method of claim 10, when the fuel cell system is not normal, further comprising generating a warning.

12. The method of claim 11, further comprising changing the sound source to another sound source corresponding to the warning to output a different sound from the sound outputted during the running of the electric vehicle.

13. The method of claim 11, further comprising outputting a warning message corresponding to the warning through a display unit.

14. The method of claim 10, further comprising, when a state of the fuel cell system varies, setting a different sound source based on the fuel cell information continuously inputted during the running of the electric vehicle to output a sound varying in stages.

15. The method of claim 10, further comprising determining by the controller, the total harmonic distortion ratio or the impedance of the fuel cell stack of the fuel cell system from the fuel cell information, dividing, by the controller the determined total harmonic distortion ratio of impedance into a plurality of sections within a normal range, and inputting the divided section value into a sound source generating unit.

16. The method of claim 15, wherein the sound source generating unit sets a different sound source every section corresponding to the section value.

17. The method of claim 15, wherein the sound source generating unit generates a different sound source by increasing or decreasing the number of sound source samples corresponding to the section value.

* * * * *